United States Patent [19]
Collier

[11] Patent Number: 5,636,001
[45] Date of Patent: Jun. 3, 1997

[54] DIGITAL FILM CAMERA AND DIGITAL ENLARGER

[76] Inventor: John Collier, 2201 Meadow La., Garland, Tex. 75040

[21] Appl. No.: 508,954

[22] Filed: Jul. 31, 1995

[51] Int. Cl.$^6$ .............................. G03B 27/52; G03B 27/74
[52] U.S. Cl. .................. 355/41; 355/68; 355/38; 396/268; 396/213
[58] Field of Search ....................... 354/227.1, 479, 354/486; 355/68

[56] References Cited

U.S. PATENT DOCUMENTS

| | | | |
|---|---|---|---|
| 4,054,890 | 10/1977 | Shimomura | 354/227 |
| 4,441,791 | 4/1984 | Hornbeck | 395/295 |
| 5,051,770 | 9/1991 | Cornuejols | 354/432 |
| 5,418,546 | 5/1995 | Nakagakiuchi | 345/85 |
| 5,541,705 | 7/1996 | Kan et al. | 354/432 |

OTHER PUBLICATIONS

Popular Science Nov. 1994 cont. "The Big Picture" by Fleischmann.

*Primary Examiner*—Arthur T. Grimley
*Assistant Examiner*—Shival P. Virmani

[57] ABSTRACT

Exposure control for cameras and photographic enlargers in which image light from a lens or light source is reflected off a spatial light modulator having a plurality of controllable elements able to be positioned in three dimensions. This reflected light is received by a photoelectric conversion device, analyzed by electronics, modulated and reflected by the spatial light modulator in a second dimension onto photosensitive material.

2 Claims, 9 Drawing Sheets

DIGITAL FILM CAMERA AND DIGITAL ENLARGER

BACKGROUND-FIELD OF INVENTION

This invention relates to the field of photography specifically to the exposure of photographic film and photographic paper.

BACKGROUND-DESCRIPTION OF PRIOR ART

In current art, the photographer must decide which part of the photograph is the most important and expose his film to get that important part exposed best and let the other parts of the photo expose as they will. This usually results in areas of the photograph which are under exposed and areas which are overexposed. To compensate for this, he must take much care to light the image properly, or if this is not possible he must spend time in the dark room dodging and burning in. These terms mean that he must turn on the enlarger, make a shadow over those areas of the print which are likely to expose too much, and he must make a hole in cardboard and project the image light through it to let light expose longer on those under exposed areas of the photo. Very often, in the case of over exposure the needed information is simply not on the negative. All this takes a long time; it is expensive; and great skill and experience are needed to accomplish it.

A type of exposure control which uses a Deformable Mirror device has been made and appears in U.S. Pat. No. 5,418,546. This device is seen in FIG. 5 and FIG. 6. However, this apparatus is a projector. It's only similarity to a film camera is it's ability to vary the exposure of light sent to a Charged Coupling Device. Film is not involved in this device.

In it a beam of light from a light bulb is reflected off a Deformable Mirror Device. The Deformable Mirror Device is controlled by electronics so that the light from the light bulb is projected in a first position onto a screen for viewing, and in a second position it is projected onto a Charged Coupling Device. By reading to light levels from the charged coupling device the projected screen image is controlled. The resolution of the image which is projected by this device is limited by the number of mirrors in the Deformable Mirror Device. It cannot be used as a film camera. It cannot receive an image directly from outside through it's lenses and expose that image to film. Consequently the Deformable Mirror Device Which it contains cannot receive, reflect, or control exposure of film to a live image received from it's lenses. Rather, it depends on electronic information to create an image. Electronic because it must depend on a Deformable Mirror Device when in a projector mode and the charged Coupling Device to produce the image in the camera mode. The image entering it's lens is full of detail, but by the time it is turned into an image signal by the Charge Coupling Device this image has been severally degraded. A directly exposed image, such as is captured by film with film's inherent resolution, is now missing.

OBJECTS AND ADVANTAGES

According, several objects and advantages of the present invention are:

(a) to provide a camera which gives greater control of film exposure;

(b) to provide a camera which does not need a standard mechanical shutter;

(c) to provide a camera which dodges and burns in during the initial exposure in real time;

(d) to provide a camera which combines the advantages of a film camera with the advantages of a digital camera;

(e) to provide a motion picture camera which has film exposure speeds much faster than those in current art;

(f) to provide a motion picture camera which has the capability of dodging and burning in while making it's exposures and thereby produces images which are much clearer, more detailed, less expensive, and with better color than those in present art;

(g) to provide a camera which can produce both digital images and film images;

(h) to provide a photographic enlarger which can automatically dodge and burn in; and (i) to provide a camera whose exposures can be controlled by an external computer.

Further objects and advantages of my invention will become apparent from a consideration of the drawings and ensuing description.

DRAWING FIGURES

Figure 5:
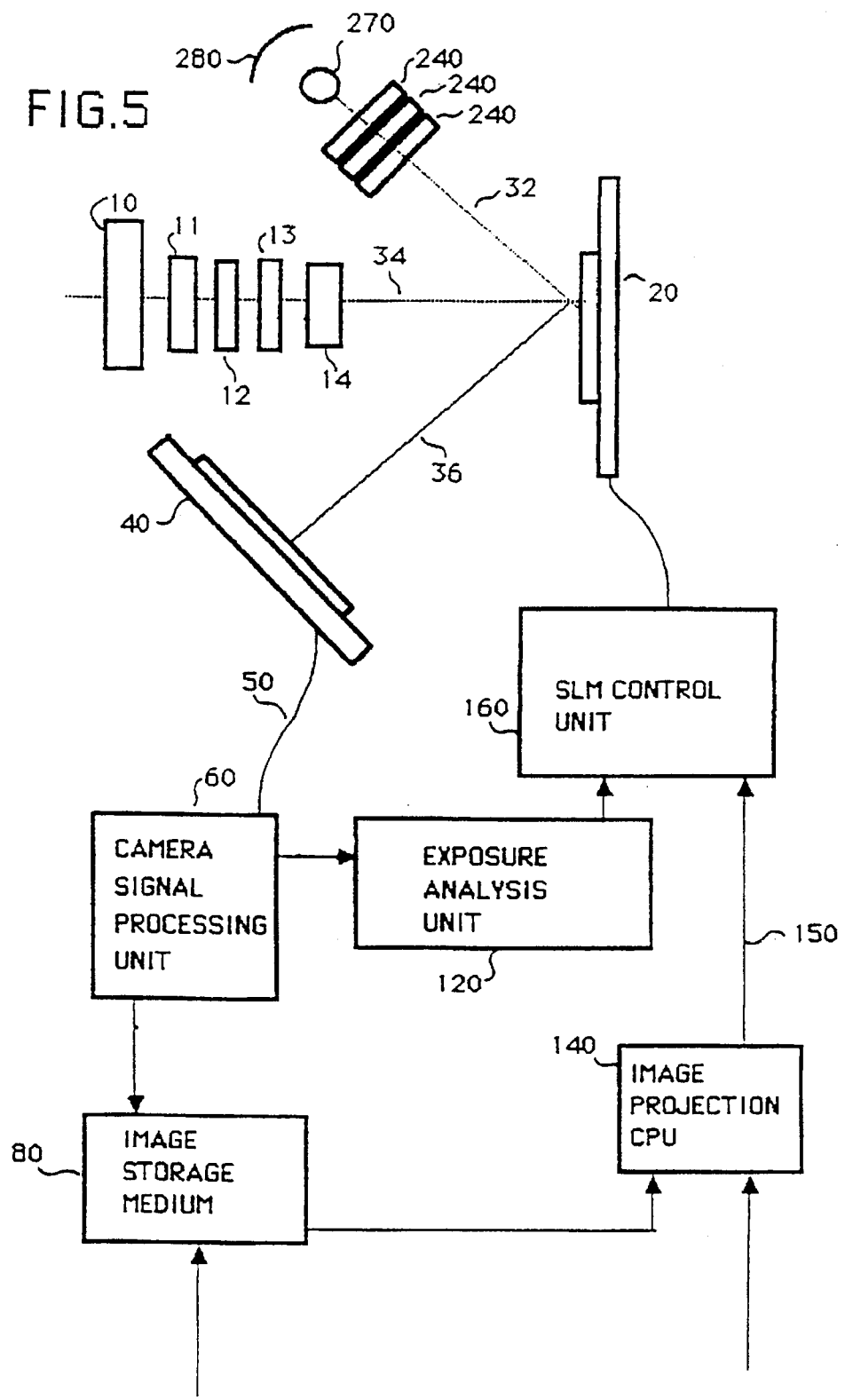

FIG. 5 is an example of prior art which uses a Spatial Light Modulator as an exposure limiting device in a projector. This is from U.S. Pat. No. 5,418,546.

Figure 6:
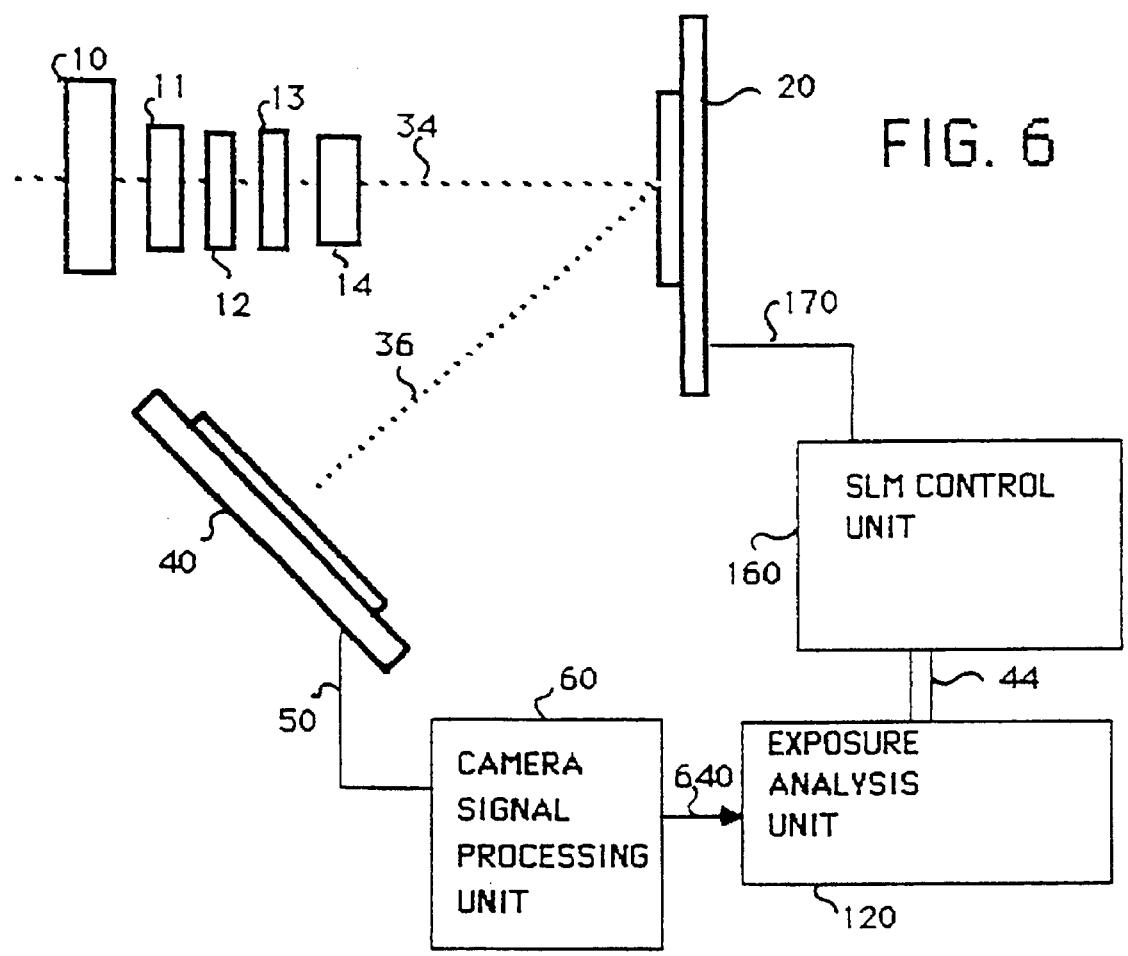

FIG. 6 is an example of prior art from U.S. Pat. No. 5,418,546.

Figure 7:
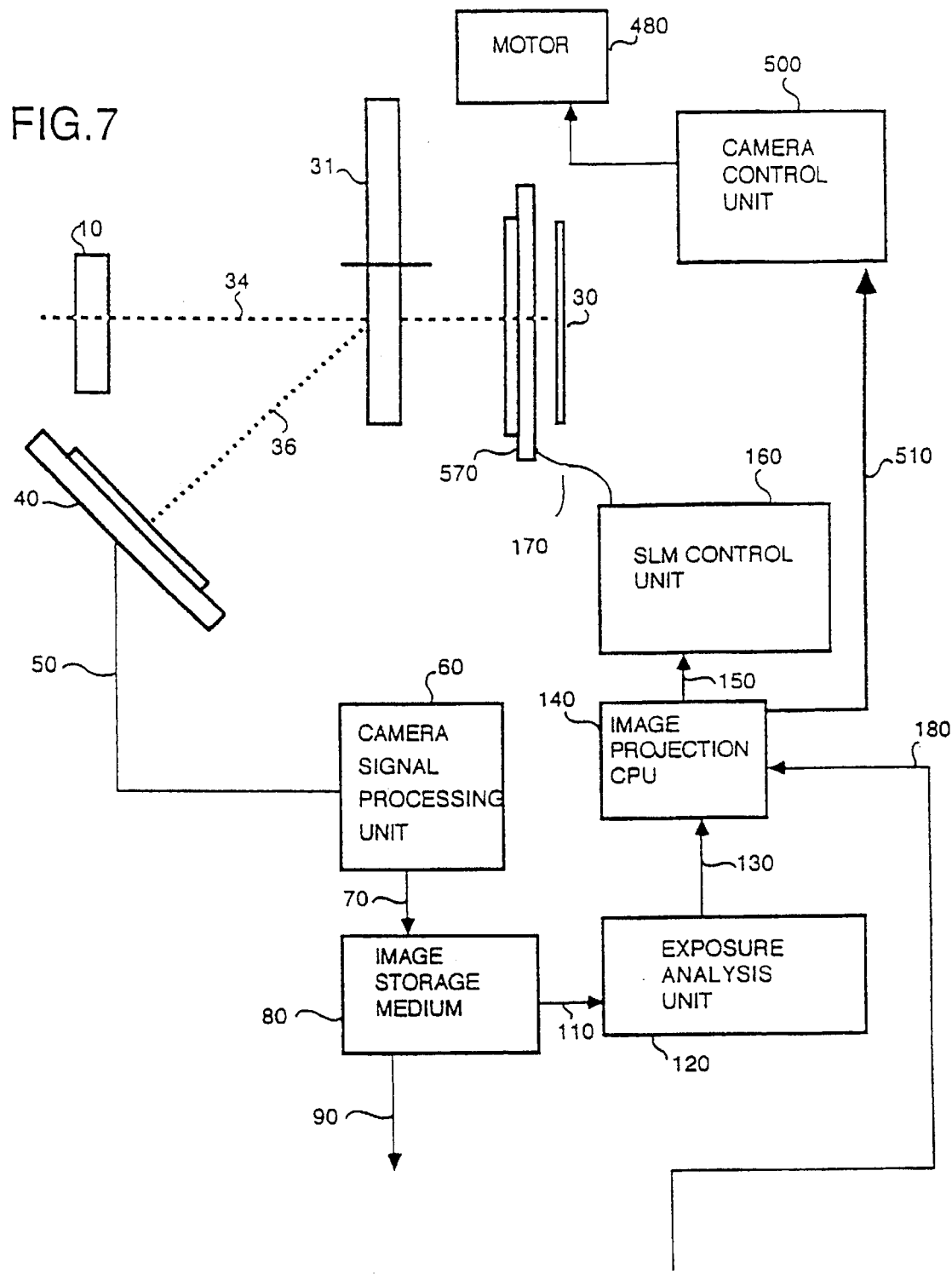

FIG. 7 is a schematic diagram showing a motion picture camera which uses a Liquid Crystal Display to limit exposure of the film. This is similar to FIG. 4 but with a Liquid Crystal Display instead of a Deformable Mirror Device.

Figure 8:
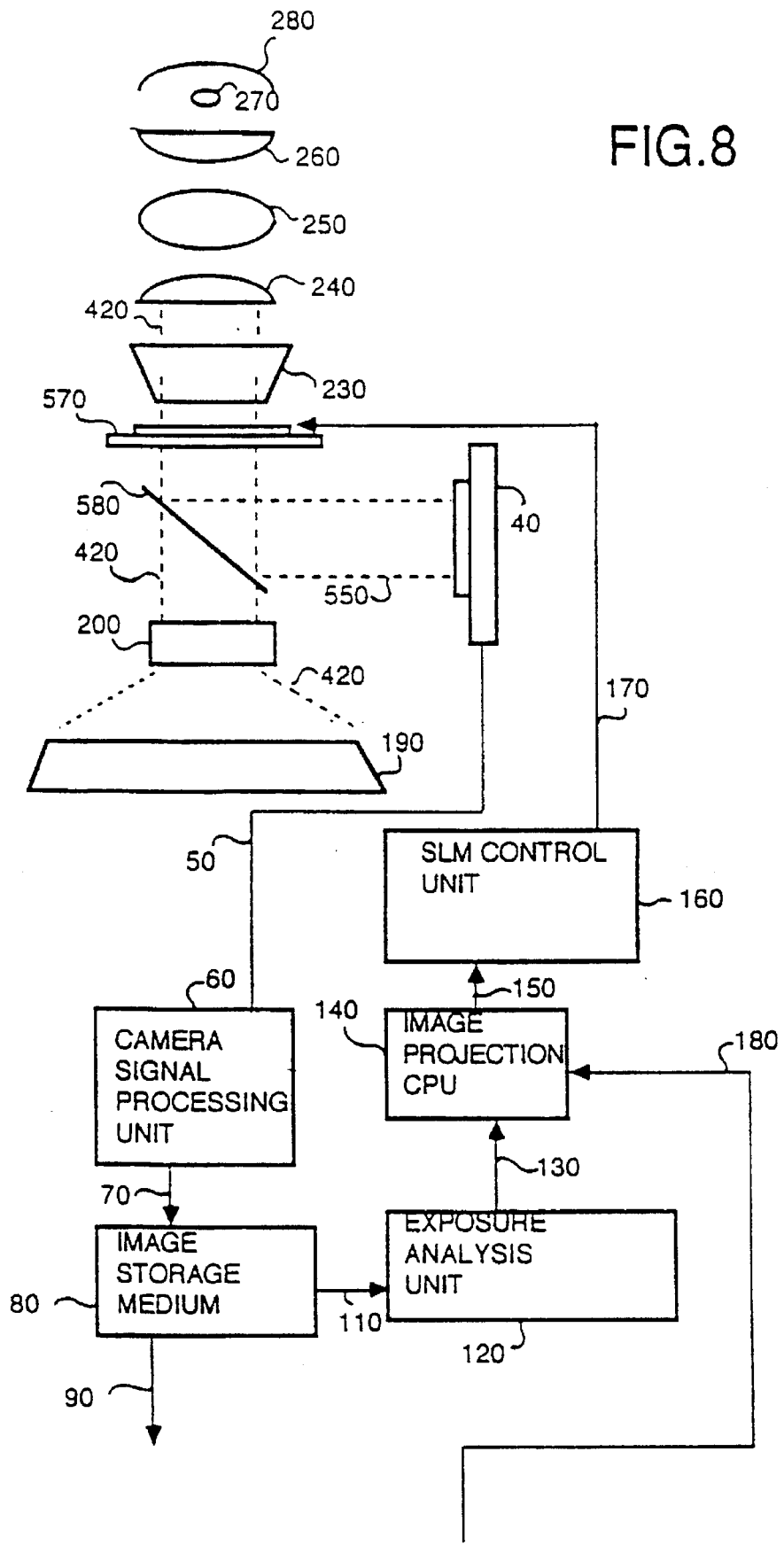

FIG. 8 is a schematic diagram showing a photographic enlarger which uses a Liquid Crystal Display instead of a Deformable Mirror Device.

Figure 9:
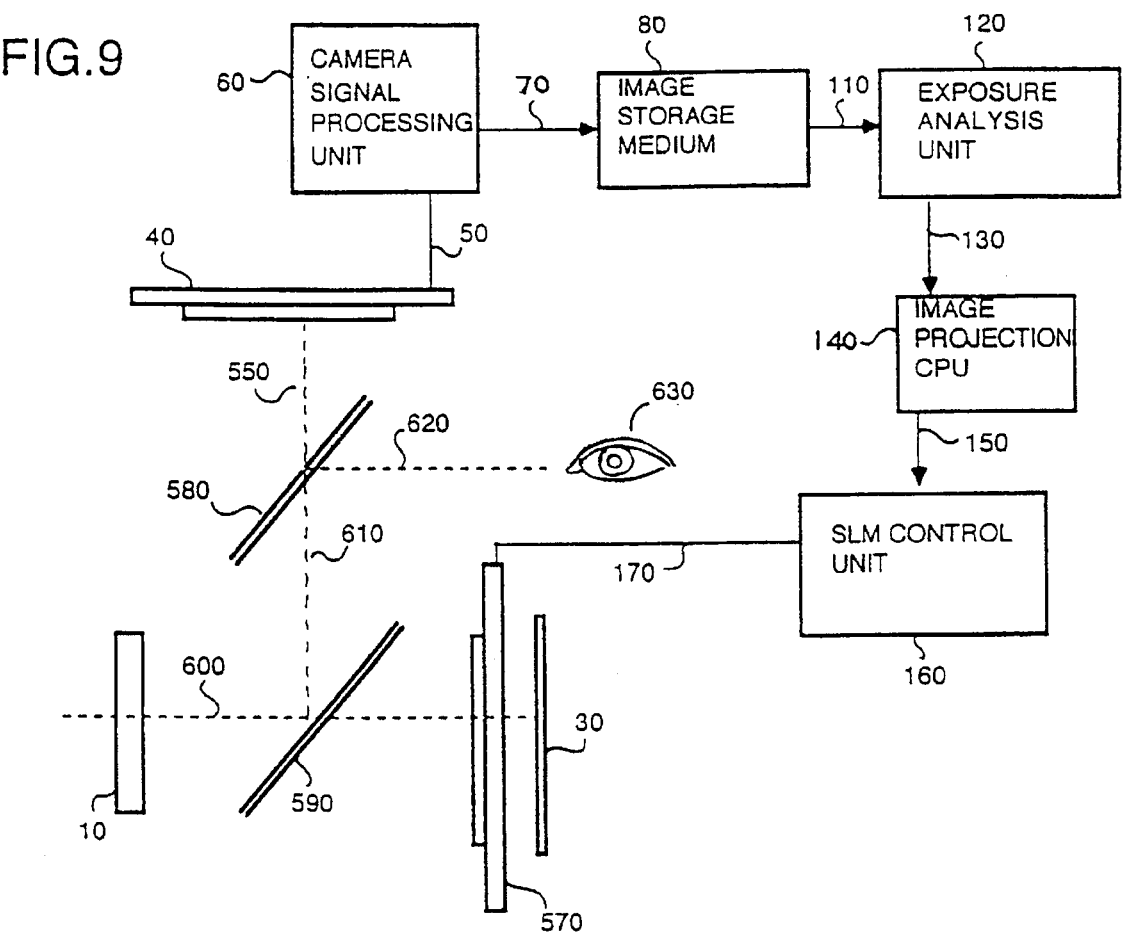

FIG. 9 is a Single Lens Reflex Camera which contains this invention, but uses a Liquid Crystal Display to vary the exposure the film.

LIST OF REFERENCE NUMERALS 10 lens system typical of single lens reflex camera
20 Spatial Light Modulator
30 photographic film
31 motion picture camera shutter
32 a light path between 20 and 30
34 a light path between 10 and 20
36 a light path between 40 and 20
40 photoelectric conversion device
50 a bus connecting 40 with 60
44 bus between 120 and 160 in U.S. Pat. No. 5,418,546
60 camera signal processing unit
70 a bus connecting 60 with 80
80 image storage medium
90 a bus connecting 80 with an external computer
110 a bus connecting 80 with 120
120 exposure analysis unit
130 a bus connecting 120 with 140
140 image projection CPU
150 a bus connecting 140 with 160

160 SLM control unit
170 a bus connecting 160 with 20
180 bus connecting external computer with image projection CPU 140
190 photographic paper
200 focusing lens
230 photographic negative
240 lens to focus light bulb 270 into light path 420
250 lens to focus light bulb 270 into light path 420
260 lens to focus light bulb 270 into light path 420
270 light bulb
280 reflector
420 a light path between 240 and 20
430 a light path between 200 and 20
440 a light path between 40 and 20
480 motor for motion picture camera
490 bus connecting 480 with 500
500 camera control unit
510 bus connecting 500 with 140
520 external digital storage controller
530 a bus connecting 520 and 540
540 external digital storage
550 light path between prism 580 and Charged Coupling Device 40
570 Liquid Crystal Display
580 prism or two way mirror
590 standard single lens reflex camera mirror
600 light path between 10 and 30
610 light path between 590 and 580
620 light path between 580 and 630
630 observer

DESCRIPTION OF INVENTION

Figure 1:
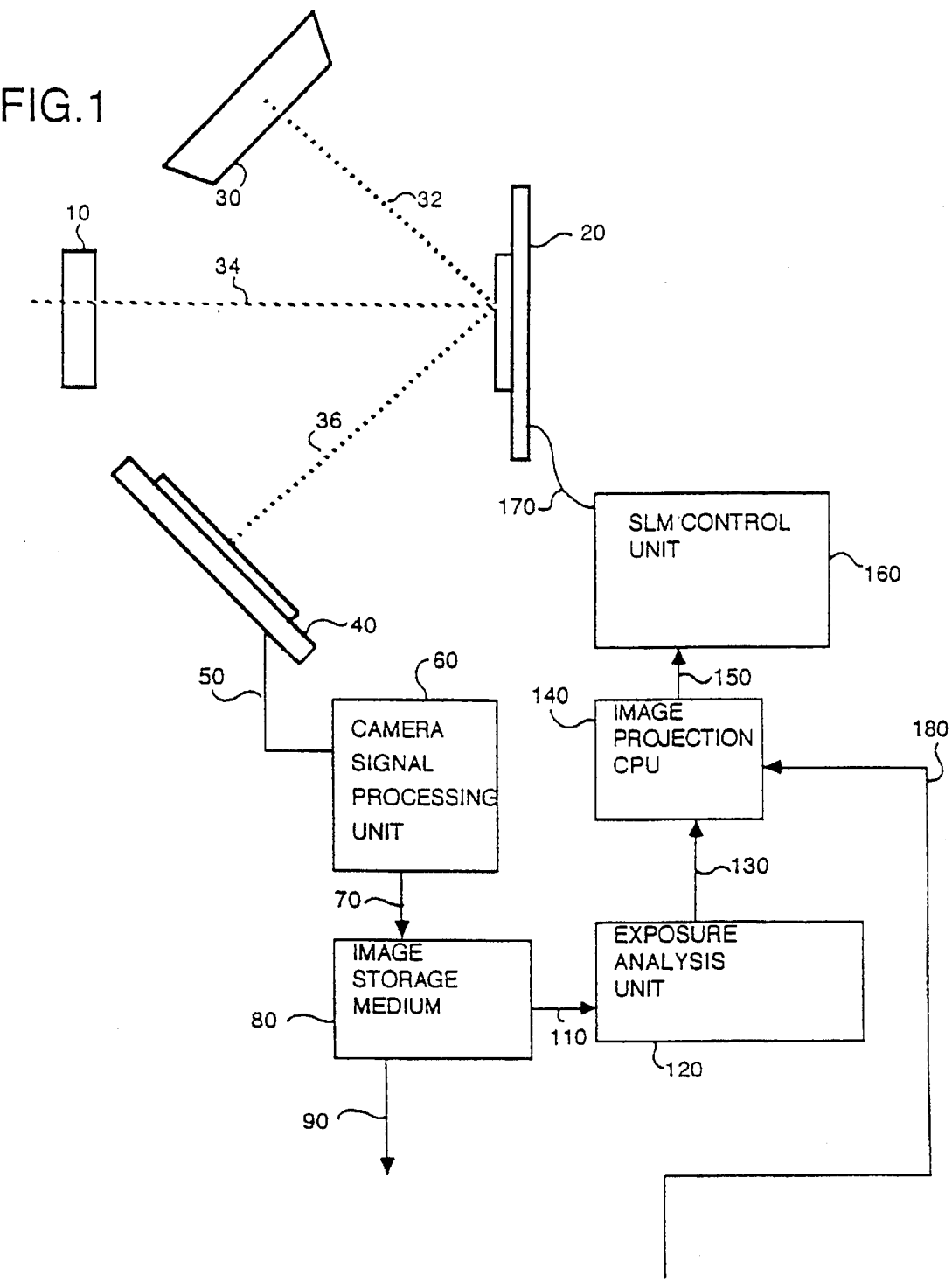
FIG. 1 is a schematic diagram illustrating the construction of a still camera which uses this invention.

FIG. 1 is a schematic diagram illustrating a camera which uses the invention. In it an image in the form of light enters through a lens 10, travels along a path 34 to a Spatial Light Modulator 20, in this case a Deformable Mirror Device. This image light then follows along light path 36 to a photo electric conversion device 40, in this case a charged coupling device. The image signal from the photo electric conversion device 40 travels along a bus 50 to a camera signal processing unit 60 and on to a image storage medium 80 by a bus 70. This image signal then proceeds along a bus 110 to the exposure analysis unit 120 and on to the image projection CPU 140 via a bus 130. From there the signal travels by bus 150 to the SLM control unit 160 and on to the spatial light modulator 20 by a bus 170. This spatial light modulator 20 then switches its mirrors so that the image light moving along the path 34 is caused to proceed along another light path 32 and onto a photosensitive material 30, in this case photographic film. Bus 90 goes to an external computer, and bus 180 returns from that computer.

Figure 2:
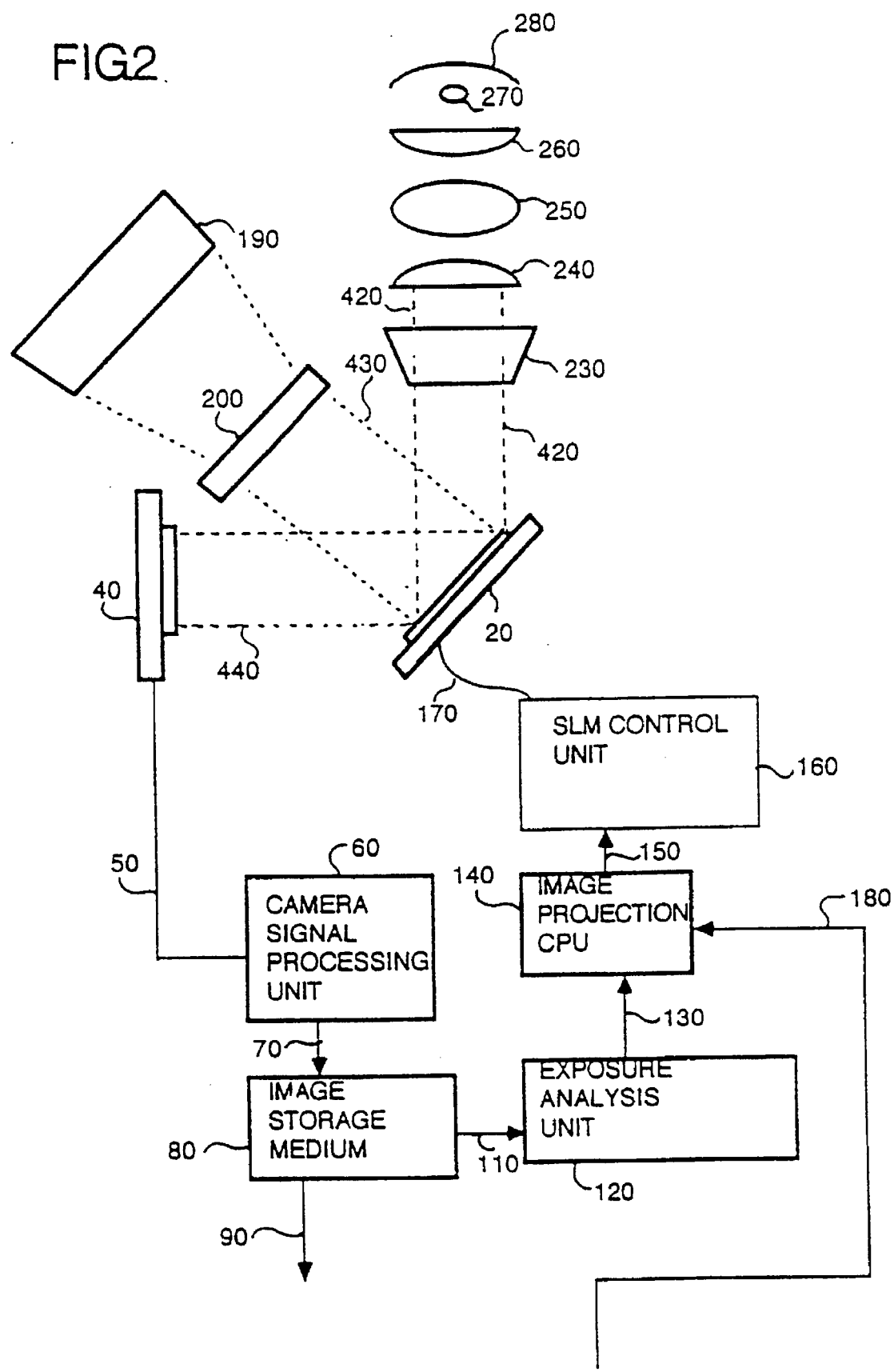
FIG. 2 is a schematic diagram illustrating the construction of a photographic enlarger which uses this invention.

FIG. 2 is a drawing of a photographic enlarger which uses the invention. In it light from a light source 270 is reflected by a reflector 280 and through a lens system 260, 250, and 240 along a light path 420. It then proceeds through a photographic negative 230 and onto a spatial light modulator 20, it is reflected by said spatial light modulator 20 and sent along a light path 440 and onto a photoelectric conversion device 40. The image signal from the photo electric device 40 travels along a bus 50 to the camera signal processing unit 60 and onto the image storage unit 80 by a bus 70. This signal may then proceed along a bus 90 to an external computer, this computer is not shown. The signal may proceed along a bus 110 to the exposure analysis unit 120 which sends it along bus 130 to the image projection CPU 140. The image signal is then sent along a bus 150 to the SLM control unit 160 and along bus 170 to the spatial light modulator 20. This spatial light modulator 20 then causes its mirrors to reflect the light coming along the light path 420 to now reflect it along a new light path 430. Said light then proceeds through the enlarger projection lens 200 and onto photographic paper 190.

Figure 3:
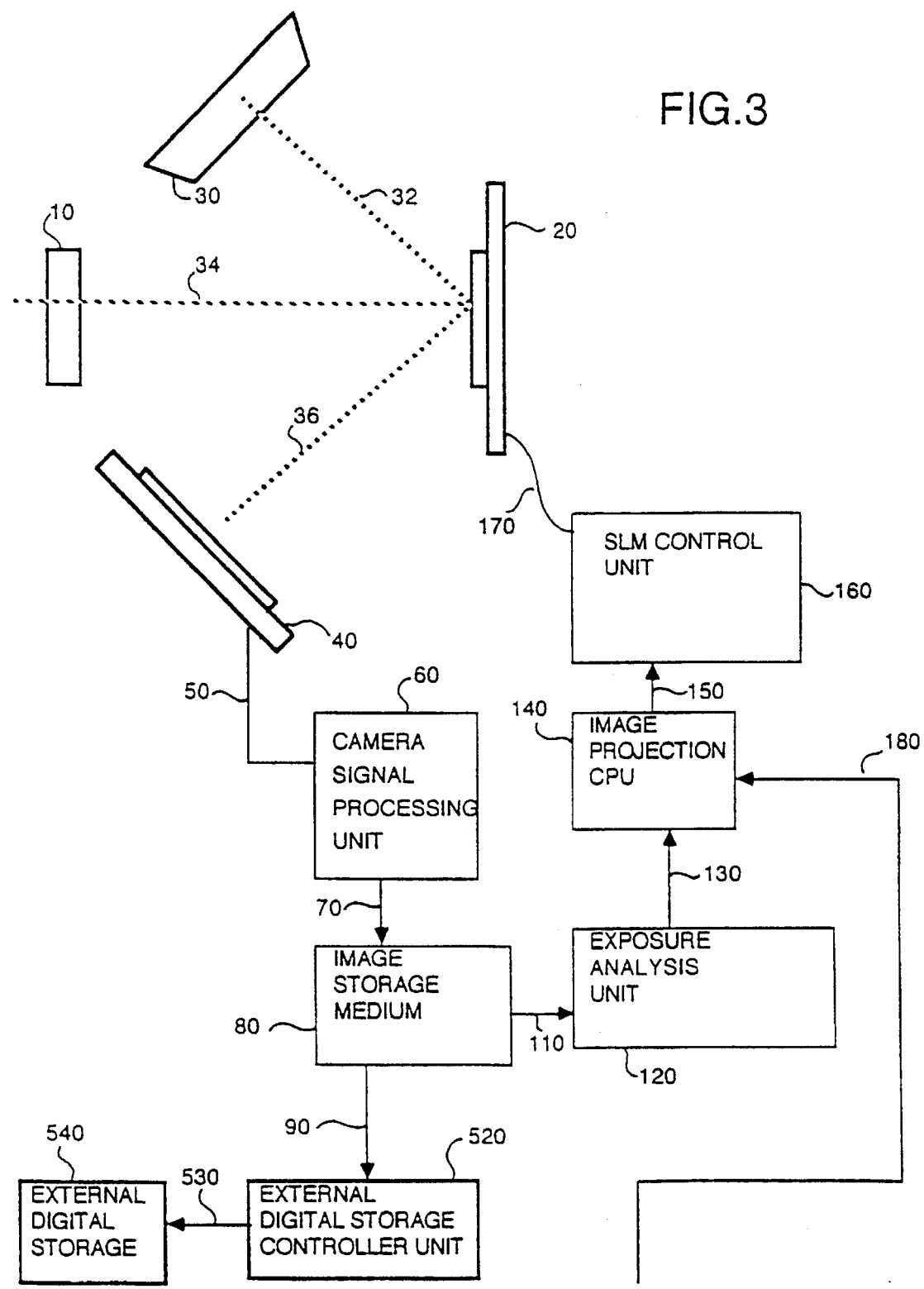
FIG. 3 is a schematic diagram showing the same camera as in FIG. 1 but with an external data storage.

FIG. 3 is a variation of the camera seen in FIG. 1. In this embodiment all the elements are the same except for the bus 90 which leads to an external digital storage controller 520 and onto the external digital storage 540 via a bus 530.

Figure 4:
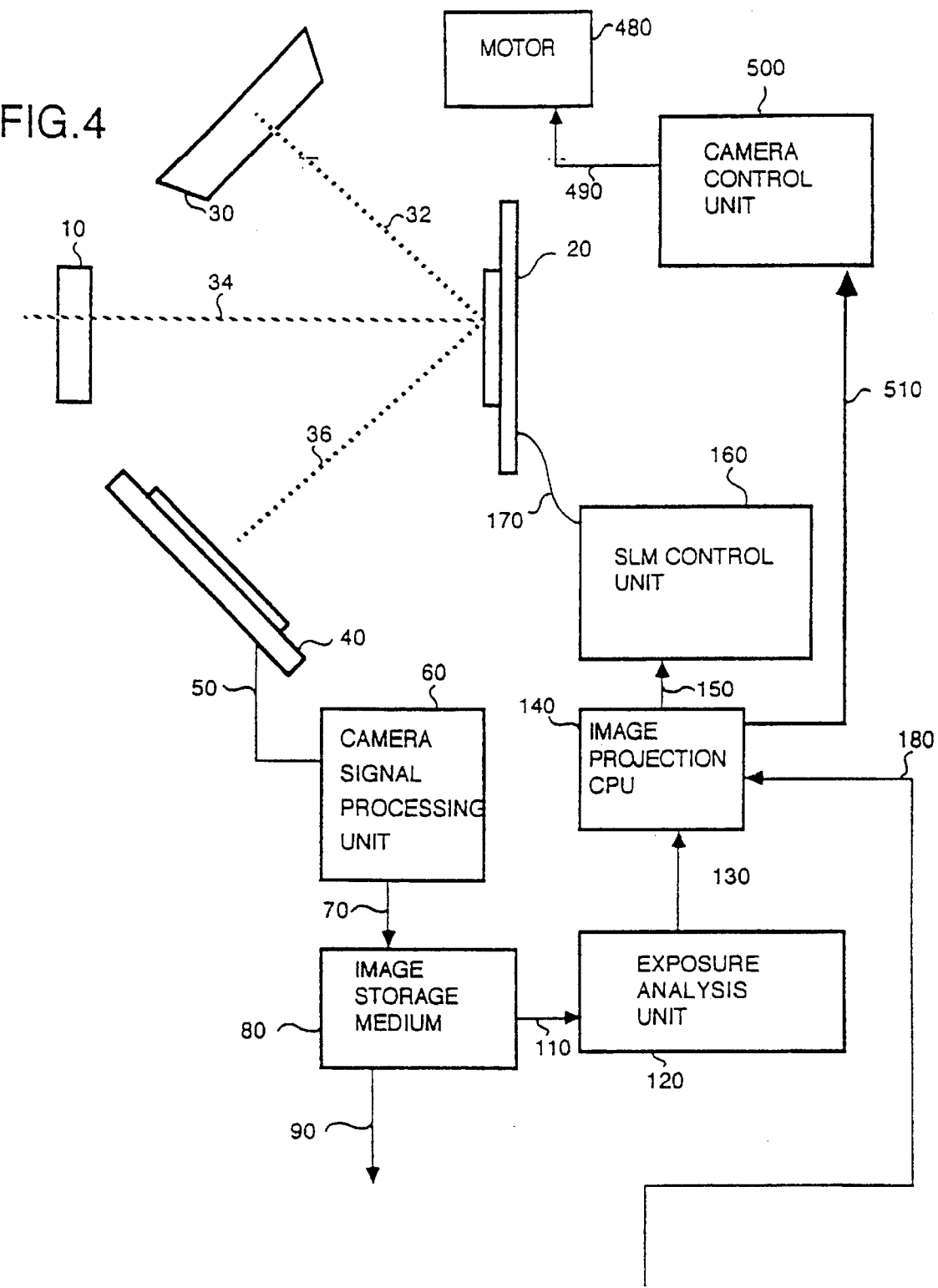
FIG. 4 is a schematic diagram showing a motion picture camera which uses this invention.

FIG. 4 is a motion picture camera which uses this invention. Its description is much the same as that of FIG. 1 except it contains a motor 480 which propels the film. An additional exception to FIG. 1 is that motor 480 is controlled by a camera control unit 500 through a bus 490. This same camera control unit 500 is controlled by the image projection CPU 14 through a bus 510.

FIG. 5 is a diagram of prior art. It is from U.S. Pat. No. 5,418,546. In it light from a source 270 is focused along the path 32 and onto a spatial light modulator 20. This same light then proceeds along the path 36 to a charged coupling device 40 which produces a signal which is analyzed by various electronics 60, 140, 80, 160, and 120. Thereby controlling a Deformable Mirror Device 20.

FIG. 6 is also an example of prior art from U.S. Pat. No. 5,418,546. In it light enters through several lens 10, 11, 12, 13, and 14 and falls on a spatial light modulator 36. This light then proceeds along a path 36 to a photo electric conversion device 40 which is connected by a bus 50, to a camera signal processing unit 60, by a bus 640 to an exposure control unit 120 which is connected to a bus 44 connecting it to the SLM control unit 160. The SLM control unit 160 is connected to the spatial light modulator 20 by a bus 170. It is n portion of FIG. 5 and it will be seen that it's purpose is to control the amount which dan fall on the charged coupling device 40.

FIG. 7 is a motion picture camera which contains this invention, but instead of using a Deformable Mirror Device as in FIG. 4 the Deformable Mirror Device is replaced by a Liquid Crystal Display 570. It will also be seen that the film 30 is placed behind the Liquid Crystal Display 570 so that light entering the camera along the path 34 proceeds past the shutter 31 through the Liquid Crystal Display 570 and onto the film 30. 0r when closed, the shutter 31 reflects the image light onto the Charged Coupling Device 40. Other operations are as they are in FIG. 4.

FIG. 8 is an example of a photographic enlarger using this invention. It is similar to FIG. 2 except it has a prism or two way mirror 580. Also instead of using a Deformable Mirror Device it uses a Liquid Crystal Display 570. In it light coming along path 420 strikes the prism 580 where it is split into two paths. The first light path proceeds along path 550 to the photoelectric conversion device 40. The other proceeds through the prism continuing along path 420 to the enlarger projection lens 200 and onto the photographic paper 190. Other parts are as described in FIG. 2.

FIG. 9 is an alternate embodiment of FIG. 1 which uses a Liquid Crystal Display 570 is used instead of a Deformable Mirror Device as in FIG. 1. This embodiment is that of a single lens reflex camera. In it light from a standard lens configuration 10 enters along path 600 strikes a single lens reflex camera mirror 590 and is sent along the path 610 where it strikes a prism or two way mirror 580 which sends part of the light along the path 620 and to the eye of the observer 630. The other part of the light proceeds through the two way mirror 580 by a path 550 and onto a charged coupling device 40 or other photo electric conversion device. Electronics are similar to those in FIG. 1 except a Liquid Crystal Display 570 is used in front of the film 30 to modulate the light received by the film 30.

OPERATION OF INVENTION

FIG. 1 is a typical embodiment of the invention. In FIG. 1 light enters the camera by way of a lens 10 along the light path 34, striking a spatial light modulator 20 having a plurality of controllable elements arranged in a first dimension. This spatial light modulator is in this case a Deformable Mirror Device. The light continues along a light path 36 to a photoelectric conversion device 40 which in this case is a Charged Coupling Device. The photoelectric conversion device 40 is read by a camera signal processing unit 60 Which converts the information from the photoelectric conversion device 40 into an image signal. This is received through a bus 50. An image storage medium 80 is provided to store the image signal it receives by way of bus 70. This stored image signal can be sent to an external computer via a bus 90. This computer is not part of the invention, but would probably take the form of a personal computer. In this personal computer, the information contained in the image storage medium 80 could be further analyzed and altered for special effects or other uses which seem appropriate to the user. This altered image signal would then be sent via bus 180 to the image projection CPU 140 for control of the spatial light modulator 20.

The image signal stored in image storage unit 80 can also be sent through a bus 110 to an exposure analysis unit 120 where said signal is processed. This processing consist of an analysis of the light levels received from the photoelectric conversion device 40. It will be understood that specific pixel locations on the photoelectric conversion device correspond to specific mirror locations on the spatial light modulator 20. So that light received at a specific location on the spatial light modulator 20 is reflected onto a specific pixel location of the photoelectric conversion device, this light level is analyzed by the electronics described below, which cause the above specific location on the spatial light modulator to shift its mirror so that it now reflects the incoming image received from the lens at that location onto the film 30. Light levels from those pixel locations seen to be too high for proper exposure onto the film 30 will be altered and those higher light levels reduced to an exposure time appropriate for the film 30. Similarly light levels contained within the image signal which are seen to be too low for proper exposure are increased in exposure time. Exposure times are controlled of course by the length of time that the mirrors of the spatial light modulator 20 reflect incoming image light 34 onto the film 30 by way of path 32. All other exposure times for values between the highest and lowest values determined by the photo electric conversion device 40 are seen as percentages of these exposure times and their exposure times are adjusted accordingly. Once these adjustments have been made in the image signal it is then sent via a bus 130 to the image projection CPU 140. The image projection CPU 140 converts the input image signal to data suitable for image display by the spatial light modulator 20, and delivers the data via a bus 150 to the SLM control unit 160 for control of the spatial light modulator 20. The individual controllable elements of the spatial light modulator 20 are controlled through the bus 170. The said individual controllable elements then reflect the light image 34 for the appropriate length of time along the light path 32. The duration of this exposure, or individual exposures as the final photograph is the result of the many exposures received from the spatial light modulator mirrors 20, is determined by the exposure analysis unit 120.

As an example if one were taking a photograph of a sunset, one would see that the suns image is too bright to expose properly if one also wants to expose the darkest shadows on the ground for a long enough exposure to keep them from underexposing. So then the suns image in the incoming light 34 reflects off the spatial light modulator 20 and along the path 36 onto the photoelectric conversion device 40. This very high light level is converted into a light signal by the camera signal processing unit 60, and is stored in the image storage medium 80. From there this signal is analyzed by the exposure analysis unit 120 where it is assigned an exposure time short enough to expose the sun properly on the film 30. Conversely, the light coming from the darkest shadows on the ground will also proceed along the same path where they will be read by the exposure analysis unit 120 and assigned an exposure time long enough to allow the darkest shadow to register on the film without under exposing. All other light levels are assigned exposure times between those two extremes at exposure times appropriate for their best exposure. It is essential to understand that unlike previous art a spatial light modulator 20 does not create the image. Rather, it reflects an existing image, alters the length of time each point of the image is exposed to film and thereby produces an image on film which values are all exposed for the proper length of time.

The principals involved in this camera in FIG. 1 can also be applied to other devices. For instance in FIG. 2 an enlarger is made to automatically dodge and burn in by using a spatial light modulator 20. In this embodiment light from a standard enlarger bulb 270 is sent along a path 420 through to a lens system 260, 250, and 240. This light shines through a photographic negative 230, onto a spatial light modulator 20 which, as in the other embodiments, first sends its light to a photoelectric conversion device 40 along a path 440. This light is thereby converted to an image signal and sent to the various electronics 60 80, 120, 140 and 160. These electronics perform the same functions as those in the preceding embodiment. This in order that the amount of light which shines through the negative 230 and onto the photographic paper 190 will create a photograph whose values are well balanced or at least as the photographer wishes them to be. This is accomplished as it was in the preceding embodiment. Areas of the negative seen to be too light for proper exposure are assigned exposure times long enough to keep them from overexposing and areas seen to be too dark are given exposure times long enough to expose them properly. The electronics work as they did in the preceding embodiment. In this embodiment an external computer can be used and accessed through bus 90 which takes the place of the exposure analysis unit 120. The external computer could then, with proper software, analyze the image signal, view it on a CRT and after said analysis instruct the spatial light modulator 20 to expose the photographic paper 190 by turning its mirrors so that light which is coming along the path 420 will be sent along the path 430, through the enlarger lens 200 and onto the photographic paper 190.

In FIG. 3 another embodiment is seen which allows the still camera in FIG. 1 to be used as a digital camera. The image signal which is contained in the image storage unit 80 is sent via the b&s 90 to an external digital storage unit 540, such as a hard disk. This hard disk would be controlled and the incoming data made to take the appropriate form by an external digital storage controller unit 520. This would allow greater freedom when choosing a medium for ones photographic image.

For instance, a news photographer might wish to send a digital version of his photograph along on to a newspaper by a modem for approval while bringing along the film negative later with it's better resolution.

In FIG. 4 I have included the device in a motion picture camera. It's operation is much the same as that of the still camera in FIG. 1, except the motion picture camera contains a motor 480 for propelling the film, an electronic device for motor control or a camera control unit 500 which coordinates the motors movement with the spatial light modulator. In this embodiment the image projection CPU 140 coordinates the motor 480 with the spatial light modulator 20 so that unexposed film 30 is presented for exposure when the spatial light modulator 20 is ready to reflect image light 34 upon it. This motion picture camera would operate as the still camera in FIG. 1 in that it would dodge and burn in but by doing this on the fly it becomes possible to produce movies of great clarity and beauty. This would allow the same care of exposure to be taken with motion pictures as is now taken with still images in the darkroom.

Another advantage to using a spatial light modulator 20 in this motion picture camera is that it can replace the standard shutter in a motion picture camera. This makes possible a shutter speed which depends only on the speed at which the spatial light modulator 20 can move its mirrors from the path 34 to the path 32, in other words a shutter speed lasting only nanoseconds. A speed far faster than existing shutters.

It is also possible to do much of I have described in the above embodiments in another way. This is by using an LCD or Liquid Crystal Display instead of a Deformable Mirror Device.

In FIG. 7 the same motion picture camera which appears in FIG. 4 is seen but an LCD 570 is used as a mask to control exposure of the film 30. Because an LCD can become either transparent or opaque depending on how it is controlled it makes an useful device for blocking the light which is proceeding the path 34. In this way by manipulating the individual pixels of the LCD 570, by letting the image light from the light path 34 through the LCD 570 for an exposure which duration is determined by the same electronics as all the other devices, and by blocking the same light for a duration determined by the same electronics, each frame of the film 30 is exposed at its several points, each without over or under exposure. Also, in both motion picture cameras of FIG. 7 and FIG. 4 the bus 90 allows access to the control of the exposure process by a remote computer. In this embodiment light entering the lens 10 would reflect off a standard motion picture camera shutter 31 and onto the photoelectric conversion device 40. From here it is treated as in the other embodiments. Then the shutter 31 turns so that it is open and the light 34 is allowed to pass. It will go through the liquid crystal display 570 for a predetermined length of time, then those areas of the photograph which are about to overexpose will cease to be exposed when the liquid crystal display 570 becomes opaque at those points. It proceeds like this with the next darkest light levels becoming opaque when they are exposed at their proper level and so on until the darkest shadows have been exposed.

In FIG. 8 an enlarger is seen which is identical in all ways to FIG. 2 except it allows the Deformable Mirror Device 20 of FIG. 2 to be replaced by a LCD 570. As light proceeds along the path 420 it continues through the photographic negative 230 and into a prism or two way mirror 580. The light is split by this mirror 580, and part of the light turns along the path 550 and onto a photoelectric conversion device 40 which generates an image signal as in the other devices. The other part of the light continues through the prism 580. From here it goes on through the enlarger lens 200 and onto the photographic paper 190. The last variation on the device is found in FIG. 9. This is a single lens reflex camera which replaces the Digital Mirror Device 20 of FIG. 1 with a LCD 570. As in the other variations which use a LCD to replace a Deformable Mirror Device this camera too has a LCD 570 in front of the film. This LCD 570 uses its various pixel elements to mask off those areas determined to need dodging and burning in as above, by the electronics. In this camera light which enters the lens 10 along a path 600 first hits the mirror 590 which is standard in all SLR cameras. It is directed by this mirror 590 along a path 610 to a prism or two way mirror 580 and is split into two paths 620, and 550. The path of light 620 continues on until it is received by the eye of the user 630. The other part of the light coming from the prism 580 proceeds along the path 550 until it is received by the photoelectric conversion device 413, probably a CCD. As in the other devices the photoelectric Conversion Device 40 produces an image signal which is read, analyzed, and sent on to the LCD 570. As in other SLR cameras when the shutter button is pushed (not shown) the mirror 590 flips up and the light proceeding along the path 600 is allowed to pass and strike the film 30 but not before it passes through and is modulated in its exposure times, as with all previous embodiments, by the LCD 570.

Conclusions Ramifications and Scope of Invention

Thus the reader will see that my camera is a highly reliable method of producing still photographs arid motion pictures which are well exposed with no over or under exposed areas. It also provides for an enlarger which can print photographs under greater control than present dark room art. Because it is impossible to anticipate all the various uses, I have also provided a method of external control by a personal computer.

While this description contains many specificities, these should not be construed as limitations on the scope of the invention, but rather as an exemplification of a few preferred embodiments thereof. Many other variations are possible. For example a camera like the present invention which has video capabilities because it has a CCD might also couple the CCD to external components needed to make a video camera. Thus producing a video camera which also takes still film images. If this is accomplished it would make an ideal surveillance camera. Most video surveillance cameras stiffer from poor video resolution, and security personnel when they desire might want a still image with its better resolution taken when it seems useful. This enlarger could be modified for use in local one hour photo stores thereby giving those stores a vastly superior product. In short, anywhere photographs are taken, they can be taken with greater clarity and beauty with this device.

Accordingly, the scope of the invention should not be determined by the embodiments illustrated, but by the appended claims and their legal equivalents.

I claim:

1. An exposure control apparatus comprising:
   (a) a lens for focusing an image light
   (b) a photoelectric conversion device for converting said image light into an electrical signal
   (c) a spatial light modulator of the deformable mirror device type reflecting said image light and having a plurality of controllable elements
   (d) a photo sensitive material (e) a control means controlling, individually and simultaneously, the plurality of controllable elements of the deformable mirror device between a first state, in which said received image light is guided to said photoelectric conversion device, and a second state in which said received image light is guided onto said photosensitive material (f) an exposure analysis unit analyzing an exposure level of said image light based on said electrical signal, said control unit controls said controllable elements based on output from said exposure analysis unit.

2. A darkroom device comprising:

(a) a focusing lens (b) a light source (c) a photographic negative (d) a spatial light modulator of the deformable mirror device type receiving light from said light source modified by the photographic negative and having a plurality of controllable elements (e) a photoelectric conversion device for converting said light source into an electrical signal (f) a control means controlling, individually and simultaneously the plurality of controllable elements of said spatial light modulator of the deformable mirror device type between a first state, in which said received light through the photographic negative is guided to said photoelectric conversion device, and a second state in which said received light through the photographic negative is guided to said focusing lens (g) an exposure analysis unit analyzing an exposure level of said image light through the photographic negative based on said electrical signal; and wherein said control unit controls said controllable elements based on output from said exposure analysis unit.

* * * * *